United States Patent Office 3,718,637
Patented Feb. 27, 1973

3,718,637
PROCESS FOR THE POLYMERIZATION OF CONJUGATED DIENES

Adel F. Halasa, 5040 Everett Road, P.O. Box 244, Bath, Ohio 44210
No Drawing. Continuation-in-part of application Ser. No. 854,268, Aug. 29, 1969. This application Mar. 25, 1971, Ser. No. 128,155
Int. Cl. C08d 3/04, 3/06, 1/20
U.S. Cl. 260—94.2 T                       15 Claims

ABSTRACT OF THE DISCLOSURE

Conjugated dienes are polymerized by a new catalyst system which permits control of the molecular weight and gives a more easily processed product, together with an increased proportion of 1,2- configuration in the polymer repeating unit structure. This catalyst system comprises (1) a sodium allyl compound having 3–10 carbon atoms and (2) a lithium alkyl, a lithium aryl or a lithium ferrocenyl, cobaltcenyl or nickelcenyl compound. The diene polymers produced by this process have controllable molecular weights in the range of 5,000 to 1,000,000, preferably 100,000 to 500,000, broad molecular weight distribution, glass transition temperatures higher than normally obtained, high degree of branching, high proportion of 1,2- repeating unit configuration, and are more easily processed in the production of rubber and other compositions for commercial use.

---

This application is a continuation-in-part of copending application Ser. No. 854,268, filed Aug. 29, 1969, now abandoned.

BACKGROUND OF THE INVENTION

Field of the invention

This invention relates to a process for the polymerization of dienes using a catalyst composition comprising a sodium allyl compound and a lithium alkyl, aryl, ferrocenyl, cobaltcenyl or nickelcenyl compound.

Related prior art

The polymerization of conjugated dienes can be effected in a variety of methods. However, there are various disadvantages in the various methods presently known including undesirable or uncontrollable properties in the products, such as lack of control of molecular weight, molecular weight distribution and processibility of the polymers. For example, the so-called "Alfin" catalyst system which has been studied extensively produces polybutadienes of approximately 5,000,000 molecular weight, or even higher, which are difficult to process for commercial use. This catalyst system generally comprises allyl sodium, sodium isopropoxide and sodium chloride. There are a number of literature references describing the Alfin process, typical of which is the review article in Rubber Age, vol. 94, October 1963, pp. 87–92.

This Alfin catalyst system effects very rapid formation of a very high molecular weight polymer having molecular weights of about 5,000,000 with about 75% of the polymer in the trans-1,4 configuration. In contrast, polymerization by an alkyl sodium, such as amyl sodium, produces a much slower polymerization reaction to give a polymer having as high as 70% in the 1,2- configuration, but with a molecular weight too low for the desired properties.

Polybutadienes prepared by the use of n-butyl lithium in n-hexane have about 8–10%, 1,2-, 53–54% trans-1,4 and 35–37% cis-1,4 configurations, which polymers do not have enough 1,2- configuration for the desired properties. By using polar modifiers or solvents, such as ethers, amines, etc., the vinyl content can be increased up to 50–70%. However, the molecular weight distribution in such cases is so narrow as to give poor processibility. Moreover, the polar modifiers act as chain terminators and prevent active polymer products that might be coupled or otherwise post-treated to improve processibility. Processibility is very important for commercial rubber tire production. Among other disadvantages poor processibility results in poor adhesion to fillers and thereby gives poor reinforcement.

High glass transition temperatures in butadiene polymers generally indicate and accompany good wet traction. Butadiene emulsion polymers have low glass transition temperatures and have poor wet traction when fabricated into tires.

SUMMARY OF THE INVENTION

In accordance with the present invention, it has now been found that conjugated diene polymers of controllable molecular weight, broad molecular weight distribution, good processibility, high glass transition temperatures and good wet traction are produced by the use of a catalyst system comprising the combination of (1) a sodium allyl compound having 3–10 carbon atoms and (2) a lithium alkyl, aryl, ferrocenyl, cobaltcenyl or nickelcenyl compound. Third and fourth components, namely a sodium alkoxide and a sodium halide, can be present in the catalyst system depending on the method used in preparing the sodium allyl compound. As shown herein these third and fourth components are not essential to the catalyst combination of this invention and improved polymerization products are also obtained if these two components are omitted.

The presence of the lithium compound effects a reduction of the molecular weight of the product from about 5,000,000 to about 500,000, a reduction of the dilute solution viscosity from about 13 to about 3, and increases the vinyl content from about 20% up to 35–50% or higher.

The hydrocarbon portion of the sodium allyl compound has 3–10 carbon atoms, and even though larger groups can be used, there is no particular advantage. The sodium can be attached to a primary, secondary or tertiary carbon atom.

These can be prepared by the reaction of metallic sodium with an alkyl halide, and propylene reacted with the resultant sodium alkyl to give the sodium allyl compound and an alkane corresponding to the alkyl group used. In cases where it is desired to prepare the sodium allyl free of the byproduct sodium halide and in the absence of the alkoxide, this can be done by starting with mercury allyl, reacting in a hydrocarbon solvent with sodium metal and decanting the sodium allyl solution from the byproduct NaHg amalgam. Similarly the lithium alkyl can be prepared free of lithium halide by reacting mercury alkyl with lithium metal and decanting the lithium alkyl product solution from the byproduct LiHg amalgam. The Hg allyls and Hg alkyls are prepared by prior art methods of preparing Hg alkyls.

Where sodium alkoxide is used to catalyze the sodium allyl formation, the hydrocarbon portion of the alkoxide advantageously has 1–10 carbon atoms. While even larger groups can be used, again there is no added advantage, and such resultant compounds are more sluggish in their activity.

The sodium alkoxide is prepared by the reaction of metallic sodium with an alcohol. This can be prepared separately and excess sodium can be used to insure that no unreacted alcohol remains to react with the intermediate sodium alkyl or with the sodium allyl compound upon mixture of the sodium alkoxide therewith. Some sodium alkoxides are available commercially.

The lithium compound is used in a proportion of 0.01 to 1.5, preferably 0.4–1 mole per mole of sodium allyl compound. In addition to the various hydrocarbon derivatives listed hereinafter, the lithium compound can be a dicyclopentadienyl derivative of iron, cobalt or nickel to which there is attached 1–9 atoms of lithium per molecule. These can be represented by the formula

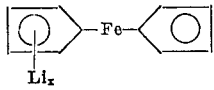

wherein $x$ has a value of 1–9, and the lithium atoms can be attached to the same cyclopentadiene ring or there may be lithium atoms attached to each such ring. The formulas for the cobaltcenyl and nickelcenyl are similar to the above except that Co and Ni respectively are substituted for Fe. The amounts to be used of lithium ferrocenyl compounds and the like are calculated on the basis of equivalents of lithium.

The ferrocenyl lithium compounds are preferred since they are more air-stable, less expensive and commercially available. The commercial product has an average of 4 atoms of lithium per molecule and is found to be most suitable for the purpose of this invention.

The corresponding azulene compounds are also suitable and their use is considered within the scope of this invention and included in the class of cenyl compounds for present purposes. The ferro compound can be represented as

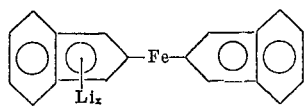

If a sodium halide is present, it is generally in the amount deposited by the reaction of sodium with the halohydrocarbon by which the sodium hydrocarbon is formed, so that generally there is a mole of sodium halide per mole of sodium hydrocarbon. The halide is generally the chloride or bromide, since these are more economical than the fluoride and iodide.

The catalyst can be prepared at room temperature, but preferably at 0° C., or even lower.

Typical sodium hydrocarbon compounds that can be used as intermediates in the preparation of the sodium allyl compounds by reaction with propylene, etc., include compounds in which the hydrocarbon portion is methyl, ethyl, n-propyl, isopropyl, n-butyl, sec.-butyl, t-butyl, n-amyl, sec.-amyl, t-amyl, n-hexyl, sec. hexyl, t-hexyl, n-octyl, 1,1,5-trimethylpentyl, n-decyl, 1-methyl-2,4-diethyl-pentyl, phenyl, tolyl, ethylphenyl, naphthyl, methylnaphthyl, benzyl, phenethyl, etc.

The sodium allyl compounds suitable for the purpose of this invention can be represented by the formula $CH_2=CHC(R)_2Na$ wherein R represents hydrogen or an alkyl group of 1–7 carbon atoms. Allyl sodium is the preferred compound, but the following derivatives of the allyl group can also be used: alpha-methyl, alpha,alpha-dimethyl, alpha-ethyl, alpha-isopropyl, alpha,alpha-diethyl, alpha-amyl, alpha-heptyl, alpha,alpha-diproyl, and the like.

Typical lithium compounds that can be used in the catalyst combination include those in which the hydrocarbon portions are the same as those listed above for the sodium hydrocarbon intermediate compounds, with lithium n-butyl and n-amyl being preferred. Of the lithium ferrocenyl, cobaltcenyl and nickelcenyl compounds described above, the commercially available compound having an average of four lithium atoms per molecule is preferred.

Typical sodium alkoxides that are suitable for catalyzing the reaction of the Na alkyl with propylene or other olefin to produce the Na allyl compound include those in which the hydrocarbon portions are methyl, ethyl, isopropyl, n-propyl, n-butyl, sec.-butyl, t-butyl, n-amyl, sec.-amyl, t-amyl (or 1,1-dimethyl-propyl), n-octyl, sec.-nonyl, n-decyl, 1,1,4-trimethyl-pentyl, 1-methyl-1,4-diethyl-pentyl, cumyl, 1-methyl-1-phenyl propyl, etc.

The polymerization is advantageously conducted in a hydrocarbon solvent, primarily for temperature control and heat dissipation. Generally a monomer concentration of 10–25 percent by weight in n-hexane or other hydrocarbon solvent such as other saturated aliphatic hydrocarbon or aromatic hydrocarbon such as benzene, toluene and the like. However, where provision is made for external heat dissipation and temperature control, the solvent can be omitted.

The catalyst is used in a proportion of 0.1 to 2, preferably 0.4–2 millimoles per 100 grams of monomer. The polymerization temperature is advantageously no higher than 125° C., and is preferably no higher than 70° C. The millimoles are calculated on the basis of the millimoles of the sodium allyl compound since the catalyst is regarded or at least is calculated as a complex of the sodium allyl with the lithium compound.

Polybutadienes produced at temperatures of 125° C., or lower, have molecular weights as high as 1,000,000, generally 100,000 to 500,000. Yields as high as 98–99% are easily produced. The 1,2- configuration in the polymer is at least 35% and generally is in the range of 35–50% when a temperature no higher than 70° C. is used. It has been found that desirable wet traction or skid resistance properties require at least 35% 1,2- configuration in the polymers. In contrast, corresponding emulsion polymers, which have low glass transition temperatures (−55 to −59° C.) also have poor wet traction properties. These polymers have 20–25% 1,2- configurations and 75–80% trans-1,4.

The polymerization is advantageously effected in the presence of an inert diluent to facilitate handling of the polymer and to give better temperature control. Normally liquid hydrocarbons are preferred for this purpose, such as benzene, toluene, saturated aliphatic hydrocarbons preferably of the straight chain variety, such as n-hexane, n-heptane, etc. The polymerization is advantageously conducted in a pressure vessel to avoid loss of monomer and solvent, particularly if temperatures are to be used at or above the boiling point of either. Preferably the polymerization temperature is no higher than 70° C., since higher temperatures give progressively lower vinyl content with increase in temperature.

Conjugated dienes that may be polymerized in accordance with this invention include: 1,3-butadiene, isoprene, chloroprene, 2-phenyl-1,3-butadiene, piperylene, etc.

Although butadiene homopolymers are preferred in the practice of this invention, butadiene copolymers can be used also where the comonomers impart desirable properties and do not detract from the polymer properties. The comonomers are preferably olefins, such as butene-1, n-butene-2, isobutylene, n-pentene-1, n-pentene-2, and the like, and also include vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4-chloronaphthalene, 1-isopropenyl-5-chloronaphthalene, vinyl diphenyl, vinyl diphenylethane, 4-vinyl-4′-methyl-diphenyl, 4-vinyl-4′-chlorodiphenyl, and the like. Preferably such comonomers have no more than 12 carbon atoms. Where such comonomers are to be used, generally at least 1%, preferably at least 5% by weight should be used and as much as 60%, preferably no more than 30% may be used.

The "dilute solution viscosity" referred to above is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

Example I

An Alfin catalyst is prepared by the following procedure: dry hexane (660 parts) is charged to a 3-necked flask provided with stirrer, inert gas sweep, a Dry Ice reflux condenser system, and an external cooling bath. To this is added 27.6 parts of finely divided sodium (2 microns maximum particle size) dispersed in xylene. The slurry is cooled to −10° C., and 85.4 parts of dry n-amyl chloride (0.8 mole) is added slowly with moderate stirring which is continued for one hour after the addition has been completed. Then 24 parts of isopropyl alcohol are added slowly. Stirring is then maintained for an additional 45 minutes. Excess dry propylene (C.P. grade) is subsequently introduced into the mixture, the temperature of which is maintained at −10° C. until active reflux of the propylene occurs. The temperature is then raised gradually to 25° C., and the mixture is stirred at this temperature for two hours. During the last 15 minutes the propylene is allowed to leave the system and is collected for recycle. The reaction slurry is transferred to a storage vessel maintained in an inert atmosphere of argon and is then diluted to 1120 parts with dry hexane. This slurry contains 0.4 mole of sodium isopropoxide, 0.4 mole of allyl sodium, 0.8 mole of sodium chloride and is considered to have 0.4 mole of catalyst complex.

Example II

To a moisture-free reactor which has been flushed with dry nitrogen, there is added 433 gm. of a hexane solution containing 100 gm. of butadiene. The solution is stirred for about 10 minutes at 30° C. and 1.528 millimoles of Alfin catalyst prepared as described in Example I is added with a hypodermic syringe under 50 lbs. of nitrogen pressure at 30° C. The system is immediately closed and the bottle rotated in a polymerization bath maintained at 30° C. for about 4 hours. The polymer is collected by pouring the mixture into a large amount of methanol containing 20 ml. of an antioxidant, such as p-phenylenediamine. The polymer is dried and a yield of 98% of theoretical is obtained. The molecular weight of the polymer is approximately 5,000,000 and the 1,2- repeating unit content is about 20%.

Example III

The procedure of Example II is repeated a number of times, each time adding a different amount of lithium n-butyl which has been prepared by the reaction of a suspension of metallic lithium in xylene with n-butyl chloride in n-hexane. The resulting colloidal suspension is used in varying amounts to give the desired amounts of n-butyl lithium. The results of the polymerizations and tests on the products are given below in Table I.

TABLE I

| mM of Ex. I Alfin catalyst/ 100 g. BD | mM of n-BuLi/ 100 g. BD | Ratio: moles of n-BuLi/ mole of Alfin catalyst | DSV | Molecular weight | Percent 1,2- | Processibility | Glass transition temperature ($T_g$ °C.) |
|---|---|---|---|---|---|---|---|
| 1.0 | 0 | | 15.6 | 4,800,000 | 20 | V. poor | −74 |
| | 0.35 | 0.35 | 1.99 | 200,000 | 63.0 | Excellent | −49 |
| | 0.8 | 0.8 | 1.56 | 150,000 | 60.2 | ___do___ | −51.2 |
| | 1.0 | 1.0 | 1.35 | 120,000 | 59.1 | ___do___ | −50.3 |
| | 1.7 | 0.1.7 | 0.79 | 95,000 | 54.3 | ___do___ | −51.6 |

As would be expected from the relative glass transition temperatures, the wet traction with modified catalyst products is much better than with the unmodified Alfin catalyst.

Example IIIA

The procedure of Example III is repeated a number of times using equivalent amounts of tetralithium ferrocenyl. The results are given below in Table II.

TABLE II

| mM of Ex. I Alfin | mM equivalent of Tetra-Li ferrocenyl | Ratio: moles of n-BuLi/ mole of Alfin catalyst | DSV | Molecular weight | Percent 1,2- | Processibility | Glass transition temperature ($T_g$ °C.) |
|---|---|---|---|---|---|---|---|
| 1.0 | 0 | | 17.40 | 5,000,000 | 20 | V. poor | −74 |
| | 0.3 | 0.3 | 1.99 | 200,000 | 65.0 | Excellent | −49 |
| | 0.6 | 0.6 | 1.55 | 150,000 | 61.1 | ___do___ | −51 |
| | 0.7 | 0.7 | 1.35 | 120,000 | 63.2 | ___do___ | −50 |
| | 1.5 | 1.5 | 0.73 | 90,000 | 60.4 | ___do___ | −51 |

Example IV

Comparative tests are made on a polybutadiene prepared according to Example III using the Alfin catalyst modified by n-BuLi (one mole per mole of Alfin catalyst) and a butyl lithium-catalyzed polybutadiene of a type being used commercially for tire production. The polymer produced according to this invention shows a bulk viscosity almost three times as high as the commercial type butyl lithium-catalyzed polybutadiene. However, the new polymer shows only slightly higher inherent viscosity measurements than for the commercial type. This information together with the respective molecular weight distribution determinations shows that the polymers of this invention are highly branched. Moreover, the overall processibility characteristics of this polymer are better than the corresponding characteristics of the compared commercial type. When the respective polymers are blended respectively in a standard oil recipe and tested with standard laboratory traction devices, the new polymer of this invention registers about 20% improvement over the commercial type on the medium and high coefficient of friction surfaces. The composition with the new polymer has a faster cure rate, which results in a slightly higher modulus and tensile strength and a lower running temperature than the commercial type. The recipe used for the testing composition is: 100 (parts) polymer; 70 ISAF Black; 43 oil; 2.5 ZnO; 2.0 stearic acid; 1.0 Santoflex 13; 1.7 sulfur; 1.4 Cyclix B. This is cured for 30 minutes at 300° F. and gives the following test results:

|  | Commercial type | New polymer |
|---|---|---|
| Stanley-London wet skid resistance index: | | |
| Surface CF 0.09 | 100 | 100 |
| Surface CF 0.39 | 91 | 112 |
| Surface CF 0.54 | 89 | 108 |
| Young's bending modulus (cured 30 minutes at 300° F.) index; at 10,000 p.s.i., ° C | −71 | −52 |

Example V

The procedures of Examples I through III are repeated with similar results using in place of the sodium allyl equivalent amounts respectively of other sodium allyl compounds as follows:

(a) alpha-methylallyl sodium
(b) alpha,alpha-dimethylallyl sodium
(c) alpha-ethylallyl sodium
(d) alpha-amylallyl sodium In the reactions of Example I where the Alfin catalyst is prepared, NaCl is formed as a byproduct and the Na isopropoxide is used to catalyze the formation of Na allyl by the reaction of the n-amyl sodium with propylene which reaction otherwise does not proceed rapidly. These reactions are represented schematically as follows:

$$C_5H_{11}Cl + 2Na \longrightarrow C_5H_{11}Na + NaCl$$

$$C_5H_{11}Na + CH_3CH=CH_2 \xrightarrow{C_3H_7ONa} NaCH_2CH=CH_2 + C_5H_{12}$$

In the presence of the n-butyl lithium added in Example III, the Na allyl gives polymerization results different from the Alfin catalyzed polymerization of Example II. This is evidenced by the difference in molecular and other properties reported in Example III.

In accordance with the present invention it has been found that, in the presence of the Li alkyl, neither the alkoxide or the halide is a necessary component and both may be omitted. Their presence is merely incidental as a result of the method of preparing the catalyst components.

In order to demonstrate that the alkoxide is unnecessary Example VI given below prepares the catalyst mixture by a method which avoids the presence of the alkoxide, and polymerizations with this catalyst having no alkoxide present likewise give polymerizations having higher vinyl content and lower viscosities and molecular weight than obtained with the Alfin catalyst, and improved cold flow resistance as compared to controls using either Na allyl or Li n-amyl by itself.

Example VI

In a 2-liter round bottomed flask equipped with a high-speed stirrer, a dropping funnel and a system for purging with dry nitrogen, there is placed one liter of dry hexane. To this is added, after nitrogen purging, 26.8 grams (1.6 moles) of sodium (as a 40% dispersion in oil) having a particle size of 1 micron. Into the dropping funnel there is placed 82.5 grams of n-amyl chloride (0.8 mole) and an equal volume of hexane. The flask is cooled in a Dry Ice-acetone-wet ice bath to −15° C. and the amyl chloride solution is added dropwise to the flask over a 2 hour period, maintaining the temperature at −15° C. Then 1.4 grams of lithium metal in the form of a 33% paste in Vaseline is added with rapid stirring. Then the mass is placed in a 50° C. bath and maintained at this temperature overnight, following which the flask is pressurized to 30 p.s.i. with propylene for 16 hours. The resultant catalyst mixture (Na allyl-Li n-amyl) is used in a series of polymerizations conducted in 28-oz. bottles sealed after addition of the reaction mixture with caps having a rubber liner with an aluminum foil inner lining. Into each bottle there is charged 500 milliliters of a butadiene-hexane mixture containing 20% butadiene. The millimoles of catalyst per 100 grams of butadiene in each case is indicated in the table below together with the results of each polymerization.

| Catalyst, mM/100 g. BD | Percent 1,2- | DSV |
|---|---|---|
| 0.384 | 36.6 | 3.64 |
| 0.64 | 34.9 | 3.86 |
| 0.96 | | 2.84 |
| 1.28 | | 1.79 |
| 1.92 | 24.9 | 1.13 |

In each of the above experiments the polymer product has improved cold flow resistance, improved processibility and more favorable glass transition temperatures compared to polymers produced using Li n-amyl by itself and Na allyl by itself.

In Example VI the following reactions take place.

$$2Na + C_5H_{11}Cl \rightarrow C_5H_{11}Na + NaCl$$

$$C_5H_{11}Na + Li \rightarrow C_5H_{11}Li + Na$$

In the presence of $C_5H_{11}Li$, the metallic sodium reacts directly with propylene:

$$Na + CH_3CH=CH_2 + C_5H_{11}Li \rightarrow$$
$$NaCH_2CH=CH_2 + \tfrac{1}{2}H_2\uparrow + C_5H_{11}Li$$

In Example VII, given below, the catalyst components are prepared by a procedure which avoids contamination by an alkali metal halide and by an alkoxide. This preparation proceeds from n-Bu Hg and (Allyl)₂Hg as follows:

$$(n-Bu)_2Hg + 2Li \rightarrow n-BuLi + 2LiHg$$

$$Hg(CH_2CH=CH_2)_2 + 2Na \rightarrow 2NaCH_2CH=CH_2 + NaHg$$

In each case the LiHg or NaHg amalgam is removed by decantation or filtration.

EXAMPLE VII

In a 2-liter round bottomed flask equipped with a high-speed stirrer, a dropping funnel and a system for purging with dry nitrogen, there is placed 1 liter of dry hexane. To this is added, after nitrogen purging, 36.8 grams (1.6 moles) of sodium (as a 40% dispersion in oil) having a particle size of one micron. Into the dropping funnel there is placed 194 grams mercury allyl (0.8 mole) and an equal volume of hexane. The mercury allyl is prepared by the known reaction of HgCl₂ with excess allyl magnesium chloride in tetrahydrofuran at 0° C. and recovered by distillation. The flask is cooled in a Dry Ice-acetone-wet ice bath to −15° C. and the mercury allyl solution is added dropwise to the flask over a 2 hour period, maintaining the temperature at −15° C. Then the NaHg amalgam is allowed to settle and the allyl solution is decanted under a nitrogen atmosphere from the amalgam. The foregoing procedure is repeated in another flask similarly equipped using an equivalent amount of lithium in place of the sodium and an equivalent amount of mercury n-butyl in place of the mercury allyl. After the resultant lithium n-butyl is separated from the LiHg amalagam it is added to thhe solution of sodium allyl. The resultant catalyst mixture (Na allyl and Li n-butyl) is used in a series of polymerizations conducted in 28-oz. bottles sealed after addition of the reaction mixture with caps having a rubber liner with an aluminum foil inner lining. Into each bottle there is charged 500 milliliters of a butadiene-hexane mixture containing 20% butadiene. The millimoles of catalyst per 100 grams of butadiene in each case is indicated in the table below together with the results of each polymerization.

| Catalyst, mM/100 g. BD | Percent 1,2- | DSV |
|---|---|---|
| 0.36 | 37.8 | 3.76 |
| 0.72 | 35.2 | 3.84 |
| 1.05 | 32.1 | 2.72 |
| 1.32 | 28.2 | 1.64 |
| 1.84 | 22.6 | 1.32 |

In each of the above experiments the polymer product has improved processability, improved resistance to cold flow and more favorable glass transition temperatures compared to polymers produced with controls using Li-n-butyl by itself and Na allyl by itself.

Example VIII

The procedures of Examples I through III are repeated with similar results using in place of the n-butyl lithium equivalent weights respectively of (a) sec.-butyl lithium
(b) tert.-butyl lithium
(c) n-hexyl lithium
(d) Benzyl lithium
(e) Phenyl lithium
(f) Pentalithium ferrocenyl [1]
(g) Dilithium ferrocenyl [2]
(h) Monolithium cobaltcenyl [2]
(i) Tetralithium nickelcenyl [2]

Example IX

The procedures of Example I through III are repeated a number of times with similar results using in place of the butadiene an equivalent weight respectively of:

(a) Isoprene
(b) Chloroprene
(c) Piperylene
(d) 2-phenyl-1,3-butadiene
(e) 75–25 mixture of butadiene and styrene
(f) 70–30 mixture of butadiene and vinyl toluene
(g) 80–20 mixture of butadiene and n-butene-1
(h) 70–30 mixture of butadiene and isoprene
(i) 75–25 mixture of isoprene and n-hexene-1

Example X

The procedures of Examples I through III are repeated with similar results using in place of the hexane an equivalent amount respectively of: benzene, toluene, n-octane, cyclohexane and methylcyclohexane.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for the hydrocarbon solution polymerization of a monomer composition containing at least 70 percent conjugated diene to produce a polymer having at least 35 percent of the diene in the 1,2 configuration with the remainder being predominantly in the trans-1,4 configuration and a molecular weight of about 100,000 to 500,000 comprising the steps of maintaining said monomer composition at a temperature of no more than 70° C. in intimate contact with a catalyst composition consisting essentially of:

(a) a sodium allyl compound having 3-10 carbon atoms; and
(b) a lithium compound selected from the class consisting of lithium alkyl, lithium aryl, lithium ferrocenyl, lithium cobaltcenyl and lithium nickelcenyl; the concentration of said catalyst composition being 0.1–2 millimoles of catalyst per 100 grams of said monomer composition, said lithium compound being present in a proportion of 0.01–1.5 lithium equivalents per mole of sodium allyl compound, said polymerization being conducted for a period of at least one hour.

2. The process of claim 1 in which said catalyst concentration is 0.4–2 millimoles per 100 grams of monomer composition, and said lithium compound is present in a proportion of 0.4–1 equivalent per mole of sodium allyl compound.

3. The process of claim 2 in which said conjugated diene is 1,3-butadiene.

4. The process of claim 2 in which said monomer composition is essentially all 1,3-butadiene.

5. The process of claim 4 in which said sodium allyl compound is sodium allyl.

6. The process of claim 4 in which said polymerization is conducted for at least 10 hours.

7. The process of claim 4 in which said lithium compound is tetralithium ferrocenyl.

8. The process of claim 4 in which said lithium compound is lithium n-butyl.

9. The process of claim 8 in which said sodium allyl compound is sodium allyl.

10. The process of claim 9 in which said polymerization is conducted in n-hexane solution.

11. The process of claim 10 in which said monomer is in n-hexane solution at a concentration of 10–25 percent by weight.

12. The process of claim 1 in which said catalyst composition is present at a concentration of 0.3–1.0 millimoles per 100 grams of said monomer.

13. The process of claim 1 in which said monomer composition is dissolved in a liquid hydrocarbon having a boiling point no higher than 110° C.

14. The process of claim 13 in which said monomer composition is present at a concentration of 10–25 percent by weight.

15. The process of claim 14 in which said liquid hydrocarbon is n-hexane.

References Cited

UNITED STATES PATENTS

| | | |
|---|---|---|
| 3,265,680 | 9/1966 | Forman et al. |
| 3,294,768 | 12/1966 | Wofford. |
| 3,324,191 | 6/1966 | Wofford. |
| 3,331,826 | 7/1967 | Talcott. |
| 3,380,984 | 4/1968 | Birchall et al. |

OTHER REFERENCES

Alfin Catalysts by Morton, Encyclopedia of Polymer Science and Tech., May 1964, pp. 629–638.

JAMES A. SEIDLECK, Primary Examiner

W. F. HAMRICK, Assistant Examiner

U.S. Cl. X.R.

252—431 R; 260—83.7, 84.1, 85.3, 94.3

---

[1] Commercial product.
[2] Prepared by reaction of stoichiometric amount of lithium with parent cenyl (dicyclopentadienyl) compound.